United States Patent
Boegner et al.

(10) Patent No.: US 8,420,583 B2
(45) Date of Patent: Apr. 16, 2013

(54) OLEFIN COPOLYMER DISPERSANT VI IMPROVER AND LUBRICANT COMPOSITIONS AND USES THEREOF

(75) Inventors: Philip J. Boegner, Glen Allen, VA (US); Charles A. Passut, Midlothian, VA (US)

(73) Assignee: Afton Chemical Corporation, Richmond, VA (US)

( * ) Notice: Subject to any disclaimer, the term of this patent is extended or adjusted under 35 U.S.C. 154(b) by 1211 days.

(21) Appl. No.: 12/019,062

(22) Filed: Jan. 24, 2008

(65) Prior Publication Data

US 2009/0192061 A1 Jul. 30, 2009

(51) Int. Cl.
*C10M 169/02* (2006.01)
*C10M 143/00* (2006.01)

(52) U.S. Cl.
USPC ........... 508/287; 508/391; 508/577; 508/460; 508/591

(58) Field of Classification Search .................. 508/334, 508/545, 287, 391, 577, 460, 591; 528/182
See application file for complete search history.

(56) References Cited

U.S. PATENT DOCUMENTS

| | | |
|---|---|---|
| 3,087,936 A | 4/1963 | Le Suer |
| 3,172,892 A | 3/1965 | Le Suer et al. |
| 3,185,704 A | 5/1965 | Kahn et al. |
| 3,215,707 A | 11/1965 | Rense |
| 3,231,587 A | 1/1966 | Rense |
| 3,254,025 A | 5/1966 | Le Suer |
| 3,272,746 A | 9/1966 | Le Suer et al. |
| 3,275,554 A | 9/1966 | Hendrik |
| 3,366,569 A | 1/1968 | Norman et al. |
| 3,373,111 A | 3/1968 | Le Suer et al. |
| 3,381,022 A | 4/1968 | Le Suer |
| 3,442,808 A | 5/1969 | Traise et al. |
| 3,565,804 A | 2/1971 | Honnen et al. |
| 3,862,265 A | 1/1975 | Steinkamp et al. |
| 3,912,764 A | 10/1975 | Palmer, Jr. |
| 4,045,407 A * | 8/1977 | Keske et al. ................. 528/182 |
| 4,110,349 A | 8/1978 | Cohen |
| 4,234,435 A | 11/1980 | Meinhardt et al. |
| 4,579,675 A | 4/1986 | Sawicki et al. |
| 4,612,132 A | 9/1986 | Wollenberg et al. |
| 4,636,322 A | 1/1987 | Nalesnik |
| 4,663,064 A | 5/1987 | Nalesnik et al. |
| 4,686,054 A | 8/1987 | Wisotsky et al. |
| 4,839,071 A | 6/1989 | Gutierrez et al. |
| 4,839,072 A | 6/1989 | Gutierrez et al. |
| 4,863,623 A | 9/1989 | Nalesnik |
| 4,867,890 A | 9/1989 | Colclough et al. |
| 5,075,383 A | 12/1991 | Migdal et al. |
| 5,334,321 A | 8/1994 | Harrison et al. |
| 5,356,552 A | 10/1994 | Harrison et al. |
| 5,384,371 A | 1/1995 | Caines et al. |
| 5,716,912 A | 2/1998 | Harrison et al. |
| 5,777,025 A | 7/1998 | Spencer et al. |
| 5,837,773 A | 11/1998 | Olivier et al. |
| 5,849,676 A | 12/1998 | Harrison et al. |
| 5,891,953 A | 4/1999 | Spencer et al. |
| 6,103,674 A * | 8/2000 | Nalesnik et al. ............. 508/334 |
| 6,107,257 A | 8/2000 | Valcho et al. |
| 6,107,258 A | 8/2000 | Esche et al. |
| 6,153,565 A | 11/2000 | Skinner et al. |
| 6,281,179 B1 | 8/2001 | Skinner et al. |
| 6,429,178 B1 | 8/2002 | Skinner et al. |
| 6,429,179 B1 | 8/2002 | Skinner et al. |
| 7,700,684 B2 | 4/2010 | Bradley et al. |
| 2004/0259742 A1 | 12/2004 | Mishra et al. |
| 2006/0003905 A1 | 1/2006 | Devlin et al. |
| 2006/0173135 A1 | 8/2006 | Devlin et al. |
| 2007/0004604 A1* | 1/2007 | Mathur et al. ................ 508/545 |
| 2007/0293409 A1 | 12/2007 | Kolp et al. |
| 2008/0113889 A1 | 5/2008 | Stokes et al. |

FOREIGN PATENT DOCUMENTS

| | | | |
|---|---|---|---|
| CA | 1335895 C | | 6/1985 |
| EP | 382450 A2 | | 8/1990 |
| WO | WO2004053030 | * | 6/2004 |

* cited by examiner

*Primary Examiner* — James Goloboy
*Assistant Examiner* — Chantel Graham
(74) *Attorney, Agent, or Firm* — Luedeka Neely Group, P.C.

(57) ABSTRACT

A lubricating oil composition and methods of operating an internal combustion engine to provide improved engine operation. The lubricating composition includes a major amount of oil of lubricating viscosity; and a minor amount of at least one highly grafted, multi-functional olefin copolymer made by reacting an acylating agent with an olefin copolymer having a number average molecular weight greater than about 10,000 up to about 50,000 in the presence of a free radical initiator to provide an acylated olefin copolymer having a degree of grafting (DOG) of the acylating agent on the olefin copolymer of from above about 1.5 to about 3.0 wt. %. The acylated olefin copolymer is then reacted with an amine to provide the highly grafted, multi-functional olefin copolymer.

11 Claims, No Drawings

OLEFIN COPOLYMER DISPERSANT VI IMPROVER AND LUBRICANT COMPOSITIONS AND USES THEREOF

TECHNICAL FIELD

The disclosure relates to lubrication oil compositions and additives for internal combustion engines and to methods of operating the engines with the compositions to provide improved engine performance.

BACKGROUND AND SUMMARY

Commercial VI improvers with dispersant properties are typically made with a particular amine that is selected to disperse soot, or with a particular amine that is selected to disperse sludge and varnish. However, unless all deleterious materials in an engine oil are effectively dispersed, oil filter plugging may occur. Combining two different amine dispersants may not always be effective for dispersing all of the deleterious materials that may cause filter plugging.

Additionally, certain commercial VI improvers with dispersant properties may be highly effective for dispersing soot at the levels generated in today's modern engines in Group I and Group II base oils. However, the treat rate for such VI improvers in high viscosity index base stocks, i.e., base stocks having a viscosity index of greater than 120, is too low to provide effective dispersant performance and relatively high shear stability.

Accordingly, there continues to be a need for lubricant formulations and additives that provide wider dispersant properties for modern engines and are effective at relatively lower treat rates than commercial VI improvers having dispersant properties.

In accordance with exemplary embodiments, the disclosure provides a lubricating oil composition and methods of operating an internal combustion engine to provide improved engine operational performance. The lubricating composition includes a major amount of oil of lubricating viscosity; and a minor amount of at least one highly grafted, multi-functional olefin copolymer made by reacting an acylating agent with an olefin copolymer having a number average molecular weight greater than about 10,000 up to about 50,000 in the presence of a free radical initiator to provide an acylated olefin copolymer having a degree of grafting (DOG) of the acylating agent on the olefin copolymer of from above about 1.5 to about 3.0 wt. %. The acylated olefin copolymer is then reacted with an amine to provide the highly grafted, multi-functional olefin copolymer.

In another exemplary embodiment, the disclosure provides a method for extending an oil drain interval for an internal combustion engine. The method includes lubricating the engine with a lubricant composition including a major amount of oil of lubricating viscosity, and a minor amount of at least one highly grafted, multi-functional olefin copolymer made by reacting an acylating agent with an olefin copolymer having a number average molecular weight greater than about 10,000 and less than about 50,000 in the present of a free radical initiator to provide an acylated olefin copolymer having a degree of grafting (DOG) of the acylating agent on the olefin copolymer ranging from about 1.5 to about 3.0 wt. %. The acylated olefin copolymer is then reacted with an amine to provide the highly grafted, multi-functional olefin copolymer, and the engine is operated using the lubricant composition.

Yet another exemplary embodiment of the disclosure provides a method of reducing oil filter plugging for an oil filter of an internal combustion engine. The method includes lubricating the engine with a lubricant composition including a major amount of oil of lubricating viscosity, and a minor amount of at least one highly grafted, multi-functional olefin copolymer made by reacting an acylating agent with an olefin copolymer having a number average molecular weight greater than about 10,000 and less than about 50,000 in the present of a free radical initiator to provide an acylated olefin copolymer having a degree of grafting (DOG) of the acylating agent on the olefin copolymer ranging from about 1.5 to about 3.0 wt. %. The acylated olefin copolymer is then reacted with an amine to provide the highly grafted, multi-functional olefin copolymer, and the engine is operated using the lubricant composition.

Accordingly, a primary advantage of the exemplary embodiments may be an increased in oil change intervals due to a lower viscosity increase in the lubricating oil for an engine operating with the lubricating oil composition. Another advantage is that a copolymer dispersant VI improver made with a certain mixture of amines may provide synergistic performance for handling a wider range of deleterious materials that may accumulate in a lubricant during engine operation.

DETAILED DESCRIPTION OF EXEMPLARY EMBODIMENTS

As described in more detail below, a lubricating oil for an internal combustion engine may have synergistically improved dispersant properties by the addition of a particular highly grafted, multi-functional olefin copolymer. More particularly, a lubricating oil containing a conventional dispersant/inhibitor (DI) package may be significantly improved for use in internal combustion engines by incorporating the below described highly grafted olefin copolymer as a dispersant/viscosity index improver. Such lubricating oil compositions, as described more fully herein, may be particularly useful for lubricating internal combustion engines (e.g., compression ignition engines, and spark ignition engines). Spark ignition engines may be operated with biofuels, direct gasoline injection, variable valve timing, turbocharging, and after-treatment. Compression ignition engines may be operated with biofuels, turbocharging, cooled exhaust gas recirculation (EGR), and after-treatment (including catalysts, diesel particulate filters, and selective catalytic reduction). Lubricant compositions containing the highly grafted, multi-functional olefin copolymer may have improved soot dispersing (deagglomeration), deposit control, varnish control, and boundary film formation performance, as well as improved viscosity performance thereby improving the wear protection for the engine.

In one embodiment, the highly grafted, multi-functional olefin copolymer product may be added to lubricating compositions in an amount sufficient to reduce the amount of oil thickening of the lubricating oil due to an increased soot content of the lubricant composition. In another embodiment, the highly grafted, multi-functional olefin copolymer product may provide high shear stability as well as improved soot dispersancy for high viscosity base stocks such as base stocks containing high levels of Group III base oil, Group IV base oils, gas-to-liquid base oils, or a mixture thereof.

As described, for example in U.S. Publication No. 2006/0173135, filed Aug. 3, 2006, a highly grafted, multi-functional olefin copolymer may be provided as the reaction product of a previously dehydrated copolymer substrate that is derived from a polymer of ethylene and one or more $C_3$ to $C_{23}$ alpha-olefins. The copolymer is acylated with an acylating agent and is further reacted with an amine to provide the multi-functional product. The foregoing multi-functional product may be used in lubrication compositions to provide one or more functions including as a viscosity index (VI) modifier, dispersant, film formation improver, deposit controller, varnish control, as well as other functions.

The polymer substrate starting material for multi-functional olefin copolymer is derived from copolymers of ethylene and one or more $C_3$ to $C_{23}$ alpha-olefins. Copolymers of ethylene and propylene are suitably used to make the copolymer. "Copolymers" herein may include without limitation blends or reacted products of ethylene and one or more $C_3$ to $C_{23}$ alpha-olefins, and additionally optionally other dienes or polyenes. Thus, "copolymers" herein also includes terpolymers, and other higher forms. Other alpha-olefins suitable in place of propylene to form the copolymer or to be used in combination with ethylene and propylene to form a terpolymer include 1-butene, 1-pentene, 1-hexene, 1-octene and styrene; .alpha,ω-diolefins such as 1,5-hexadiene, 1,6-heptadiene, 1,7-octadiene; branched chain alpha-olefins such as 4-methylbutene-1,5-methylpentene-1 and 6-methylheptene-1; and mixtures thereof.

Methods for making the copolymers described above are described, e.g., in U.S. Pat. Nos. 4,863,623, 5,075,383, and 6,107,257, which descriptions are incorporated herein by reference. The polymer substrate also may be commercially obtained having the properties indicated herein.

More complex polymer substrates, often designated as interpolymers, also may be used as the olefin polymer starting material, which may be prepared using a third component. The third component generally used to prepare an interpolymer substrate is a polyene monomer selected from nonconjugated dienes and trienes. The-non-conjugated diene component is one having from 5 to 14 carbon atoms in the chain. For example, the diene monomer may be characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, vinylnorbornene, 5-methylene-2-norborene, 1,5-heptadiene, and 1,6-octadiene. A mixture of more than one diene may be used in the preparation of the interpolymer. A suitable nonconjugated diene for preparing a terpolymer or interpolymer substrate is 1,4-hexadiene.

The triene component may have at least two nonconjugated double bonds, and up to about 30 carbon atoms in the chain. Typical trienes that may be used to prepare the interpolymer of the disclosure are 1-isopropylidene-3α,4,7,7α-tetrahydroindene, 1-isopropylidenedicyclopentadiene, dihydroisodicyclopentadiene, and 2-(2-methylene-4-methyl-3-pentenyl)[2.2.1]bicyclo-5-heptene.

Ethylene-propylene or higher alpha-olefin copolymers may consist of from about 15 to 80 mole percent ethylene and from about 85 to 20 mole percent $C_3$ to $C_{23}$ alpha-olefin with the mole ratios in one embodiment being from about 35 to 75 mole percent ethylene and from about 65 to 25 mole percent of a $C_3$ to $C_{23}$ alpha-olefin, with the proportions in another embodiment being from 50 to 70 mole percent ethylene and 50 to 30 mole percent $C_3$ to $C_{23}$ alpha-olefin, and the proportions in yet another embodiment being from 55 to 65 mole percent ethylene and 45 to 35 mole percent $C_3$ to $C_{23}$ alpha-olefin.

Terpolymer variations of the foregoing polymers may contain from about 0 to 10 mole percent of a nonconjugated diene or triene. Other termonomer levels are less than 1 mole percent.

The starting polymer that is acylated is desirably an oil-soluble, linear or branched polymer having a number average molecular weight from about 10,000 to about 50,000, and for example a number average molecular weight of 12,000 to 40,000, as determined by gel permeation chromatography and universal calibration standardization. Other useful molecular weights may range from about 15,000 to about 25,000 and from about 35,000 to about 45,000.

The term "polymer" is used generically to encompass ethylene copolymers, terpolymers or interpolymers. Such materials may contain amounts of other olefinic monomers so long as the basic characteristics of the polymers are not materially changed.

The polymerization reaction used to form an ethylene olefin copolymer may be conducted in the presence of a conventional Ziegler-Natta or metallocene catalyst system. The polymerization medium is not specific and may include solution, slurry, or gas phase processes, as known to those skilled in the art. When solution polymerization is employed, the solvent may be any suitable inert hydrocarbon solvent that is liquid under reaction conditions for polymerization of alpha-olefins; examples of satisfactory hydrocarbon solvents include straight chain paraffins having from 5 to 8 carbon atoms, with hexane being preferred. Aromatic hydrocarbons, for example, aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above are particularly suitable. The solvent selected may be a mixture of one or more of the foregoing hydrocarbons. When slurry polymerization is employed, the liquid phase for polymerization is preferably liquid propylene. It is desirable that the polymerization medium be free of substances that will interfere with the catalyst components.

The polymer described above, i.e., the olefin polymer component, may be conveniently obtained in the form of ground or pelletized polymer. The olefin polymer may also be supplied as either a pre-mixed bale or a pre-mixed friable chopped agglomerate form.

In one embodiment, ground polymer bales or other forms of the olefin copolymer are fed to an extruder e.g., a single or twin screw extruder, or a Banbury or other mixer having the capability of heating and effecting the desired level of mechanical work (agitation) on the polymer substrate for the dehydration step. A nitrogen blanket can be maintained at the feed section of the extruder to minimize the introduction of air.

The olefin copolymer is initially heated before being admixed with any other reactants in the extruder or other mixer with venting to eliminate moisture content in the feed material. The dried olefin copolymer is in one embodiment then fed into another extruder section or separate extruder in series for conducting the grafting reaction.

A graft monomer is next grafted onto the polymer backbone of the polymer olefin copolymer to form an acylated ethylene-alphaolefin polymer.

Suitable graft monomers include ethylenically unsaturated carboxylic acid materials, such as unsaturated dicarboxylic acid anhydrides and their corresponding acids. Examples of these graft monomers are set forth, for example, in U.S. Pat. No. 5,837,773, which descriptions are incorporated herein by reference. Carboxylic reactants which are suitable for grafting onto the ethylene-alphaolefin interpolymers contain at least one ethylenic bond and at least one carboxylic acid or its anhydride groups or a polar group which is convertible into said carboxyl groups by oxidation or hydrolysis. The carboxylic reactants are selected from the group consisting of acrylic, methacrylic, cinnamic, crotonic, maleic, fumaric and itaconic reactants or a mixture of two or more of these. In the case of unsaturated ethylene copolymers or terpolymers, itaconic acid or its anhydride is useful due to its reduced tendency to form a cross-linked structure during the free-radical grafting process.

The ethylenically unsaturated carboxylic acid materials typically may provide one or two carboxylic groups per mole of reactant to the grafted copolymer. That is, methyl methacrylate may provide one carboxylic group per molecule to the grafted copolymer while maleic anhydride may provide two carboxylic groups per molecule to the grafted copolymer.

The grafting reaction to form the acylated olefin copolymers is generally carried out with the aid of a free-radical initiator either in bulk or in solution. The grafting may be carried out in the presence of a free-radical initiator dissolved in oil. The use of a free-radical initiator dissolved in oil results in a more homogeneous distribution of acylated groups over the olefin copolymer molecules.

The free-radical initiators which may be used to graft the ethylenically unsaturated carboxylic acid material to the polymer backbone include peroxides, hydroperoxides, peresters, and also azo compounds and preferably those which have a boiling point greater than 100° C. and decompose thermally within the grafting temperature range to provide free radicals. Representatives of these free-radical initiators are azobutyronitrile, dicumyl peroxide, 2,5-dimethylhexane-2,5-bis-tertiarybutyl peroxide and 2,5-dimethylhex-3-yne-2, 5-bis-tertiary-butyl peroxide. The initiator may be used in an amount ranging from about 0.005% to about 1% by weight based on the weight of the reaction mixture.

To perform the grafting reaction as a solvent-free or essentially solvent-free bulk process, the graft monomer and olefin copolymer are in one embodiment fed to an extruder, e.g., a single or twin screw extruder e.g. Werner & Pfleiderer's ZSK series, or a Banbury or other mixer, having the capability of heating and effecting the desired level of mechanical work (agitation) on the reactants for the grafting step. In one embodiment, grafting is conducted in an extruder, and particularly a twin screw extruder. A nitrogen blanket is maintained at the feed section of the extruder to minimize the introduction of air.

In another embodiment, the olefinic carboxylic acylating agent may be injected at one injection point, or is alternatively injected at two injection points in a zone of the extruder without significant mixing e.g. a transport zone. Such injection may result in an improved efficiency of the grafting and may lead to a lower gel content of the grafted copolymer.

Suitable extruders are generally known available for conducting grafting, and the prior dehydration procedure. The dehydration of the polymer substrate and subsequent grafting procedures may be performed in separate extruders set up in series. Alternatively, a single extruder having multiple treatment or reaction zones may be used to sequentially conduct the separate operations within one piece of equipment. Illustrations of suitable extruders are set forth, e.g., in U.S. Pat. No. 3,862,265 and U.S. Pat. No. 5,837,773, which descriptions are incorporated herein by reference.

In forming the acylated olefin copolymers, the olefin copolymer generally is fed to plastic processing equipment such as an extruder, intensive mixer or masticator, heated to a temperature of at least 60°, for example, 150° to 240° C., and the ethylenically unsaturated carboxylic reagent and free-radical initiator are separately co-fed to the molten copolymer to effect grafting. The reaction is carried out optionally with mixing conditions to effect grafting of the olefin copolymers. If molecular weight reduction and grafting are performed simultaneously, illustrative mixing conditions are described in U.S. Pat. No. 5,075,383, which are incorporated herein by reference. The processing equipment is generally purged with nitrogen to prevent oxidation of the copolymer and to aid in venting unreacted reagents and byproducts of the grafting reaction. The residence time in the processing equipment is controlled to provide for the desired degree of acylation and to allow for purification of the acylated copolymer via venting. Mineral or synthetic lubricating oil may optionally be added to the processing equipment after the venting stage to dissolve the acylated copolymer.

The grafting reaction may also be carried out in solvent-free or essentially solvent free environment. Accordingly, the grafting reaction may be performed in the absence of hydrocarbon solvents. The avoidance of hydrocarbon solvents during the grafting reaction, such as alkanes (e.g., hexane), may eliminate or significantly reduce the risk and problem of undesired side reactions of such solvents during the grafting reaction which can form undesired grafted by-products and impurities. Also, reduced amounts of transient unfunctionalized polymer (ungrafted polymer) are present after grafting in solventless grafting reactions, which may result in a more active product.

Hydrocarbon solvents that may be omitted according to certain embodiments of the present disclosure include solvents that generally are more volatile than the reactants of the grafting reaction described herein, for example, solvents having a boiling point less than about 150° C. under standard atmospheric pressure conditions (i.e., approximately 14.7 lb./in$^2$ absolute). The solvents that may be omitted include, for example, open-chain aliphatic compounds such as $C_9$ or lower alkanes, alkenes and alkynes (e.g., $C_5$ to $C_8$ alkanes such as hexane); aromatic hydrocarbons (e.g., compounds having a benzene nucleus such as benzene and toluene); alicyclic hydrocarbons such as saturated cyclic hydrocarbons (e.g., cyclohexane); ketones; or any combinations of these. In one embodiment, it is desirable to omit all solvents having boiling points approximating or lower than that of nonane under standard atmospheric conditions. Some conventional grafting reactions have been performed in the presence of considerable amounts of hydrocarbon solvent, such as approximately 15% to 60% hexane content. By comparison, in one embodiment of the present disclosure, the total amount of these types of such solvents in the grafting reaction mass does not exceed 0.5 wt. % content thereof.

The grafted copolymer intermediate exits from the die face of the extruder either immediately after grafting, or after shearing and vacuum stripping (discussed below in more detail) if performed in different sections of the same extruder or a separate extruder arranged in series with the extruder in which grafting is conducted.

The resulting copolymer intermediate comprises an acylated olefin copolymer characterized by having carboxylic acid acylating functionality randomly within its structure. The amount of carboxylic acid acylating agent (e.g., maleic anhydride) that is grafted onto the prescribed copolymer backbone (i.e., the copolymer substrate) is important. This parameter is referred to herein as the degree of grafting (DOG), further described as the mass percentage of acylating agent on the acylated copolymer. For the purposes of this disclosure, the DOG may range from about 1.5 to 3.0 wt. %, particularly in the range of 2.0 to 2.5 wt. % of carboxylic acid acylating agent grafted on the copolymer backbone.

The DOG value of a particular additive reaction product may be determined either by infrared peak ratio analysis of acid or anhydride moiety versus copolymer alkyl functionality or by titration (Total Acid/Anhydride Number) (TAN) of the additive reaction product. The TAN value in turn can be used to estimate the degree of grafting (DOG).

The carboxylic reactant is grafted onto the prescribed copolymer backbone to provide 0.3 to 0.65 carboxylic groups per 1000 number average molecular weight units (Mn) of the copolymer backbone, desirably 0.4 to 0.55 carboxylic groups per 1000 number average molecular weight. For example, a copolymer substrate with $M_n$ of 10,000 may be grafted with 3 to 6.5 carboxylic groups per copolymer chain or 1.5 to 3.8 moles of maleic anhydride per mole of copolymer. A copolymer with $M_n$ of 40,000 may grafted with 12 to 26 carboxylic groups per copolymer chain or 6 to 13 moles of maleic anhydride per copolymer chain. The minimum level of functionality is the level needed to achieve the minimum satisfactory dispersancy performance.

The molecular weight of the acylated olefin copolymer, i.e., the copolymer intermediate, may be reduced by mechanical, thermal, or chemical means, or a combination thereof. Techniques for degrading or reducing the molecular weight of such copolymers are generally known in the art. The number average molecular weight is reduced to suitable level for use in single grade or multigrade lubricating oils.

In one embodiment, the initial copolymer intermediate has an initial number average molecular weight ranging from about 1,000 to about 500,000 upon completion of the grafting reaction. In one embodiment, to prepare an additive intended for use in multigrade oils, the copolymer intermediate's number average molecular weight is reduced down to a range of about 10,000 to about 50,000.

Alternatively, grafting and reduction of the high molecular weight olefin copolymer may be done simultaneously. In another alternative, the high molecular weight olefin copolymer may be first reduced to the prescribed molecular weight before grafting. When the olefin copolymer's average molecular weight is reduced before grafting, its number average molecular weight is sufficiently reduced to a value below about 50,000, e.g., in the range of about 10,000 to 45,000.

Reduction of the molecular weight of the copolymer intermediate, or the olefin copolymer feed material during or prior to grafting, to a prescribed lower molecular weight typically is conducted in the absence of a solvent or in the presence of a base oil, using either mechanical, thermal, or chemical means, or combination of these means. Generally, the copolymer intermediate, or olefin copolymer, is heated to a molten condition at a temperature in the range of about 250° C. to about 350° C. and it is then subjected to mechanical shear, thermally or chemical induced cleavage or combination of said means, until the copolymer intermediate (or olefin copolymer) is reduced to the prescribed molecular weight. The shearing may be effected within an extruder section, such as described, e.g., in U.S. Pat. No. 5,837,773, which descriptions are incorporated herein by reference. Alternatively, mechanical shearing may be conducted by forcing the molten copolymer intermediate (or olefin copolymer) through fine orifices under pressure or by other mechanical means.

Upon completion of the grafting reaction, unreacted carboxylic reactant and free radical initiator usually are removed and separated from the copolymer intermediate before further functionalization is performed on the copolymer intermediate. The unreacted components may be eliminated from the reaction mass by vacuum stripping, e.g., the reaction mass may be heated to temperature of about 150° C. to about 450° C. under agitation with a vacuum applied for a period sufficient to remove the volatile unreacted graft monomer and free radical initiator ingredients. Vacuum stripping may be performed in an extruder section equipped with venting means.

The copolymer intermediate may be pelletized before further processing in accordance with embodiments of the disclosure herein. Pelletization of the copolymer intermediate helps to isolate the intermediate product and reduce contamination thereof until further processing is conducted thereon at a desired time.

The copolymer intermediate may be formed into pellets by a variety of process methods commonly practiced in the art of plastics processing. Such techniques include underwater pelletization, ribbon or strand pelletization or conveyor belt cooling. When the strength of the copolymer is inadequate to form into strands, the preferred method is underwater pelletization. Temperatures during pelletization should not exceed 30° C. Optionally, a surfactant may be added to the cooling water during pelletization to prevent pellet agglomeration.

The mixture of water and quenched copolymer pellets is conveyed to a dryer such as a centrifugal drier for removal of water. Pellets may be collected in a box or plastic bag at any volume for storage and shipment. Under some conditions of storage and/or shipment at ambient conditions, pellets may tend to agglomerate and stick together. The pellets may be ground by mechanical methods to provide high surface area solid pieces for easy and quick dissolution into oil.

The pelletized copolymer intermediate may be supplied as an unground or ground form of the pellets. The pelletized acylated copolymer intermediate is dissolved in solvent neutral oil. The pellets generally are dissolved in the solvent at an introduction level of from about 5 wt. % to about 25 wt. %, particularly about 10 wt. % to about 15 wt. %, and more particularly about 12 wt. % to about 13 wt. %, based on the resulting solution (solute and solvent) viscosity.

The pelletized copolymer intermediate may be dissolved in the solvent neutral at temperature of, for example, about 135° C. to about 165° C. with mechanical stirring under a nitrogen blanket. The dissolving mixture may be sparged with inert gas during the dissolution for about 4 to 16 hours. Such treatment may be performed in a continuous stirred process vessel of suitable capacity.

The inert sparging gas may be nitrogen. The dissolution and sparging, if used, may be prior to the subsequent amination procedure. One or more spargers are located within the vessel at locations submerged beneath the surface of the solution, preferably near the bottom of the solution, and bubble inert gas through the solution. Nitrogen sparging removes moisture from the dissolved copolymer intermediate and solvent oil. Importantly, the removal of moisture from the copolymer intermediate may act to convert any polymeric dicarboxylic diacids present back to the desired copolymeric dicarboxylic anhydride form.

For instance, where maleic anhydride is used as the grafting monomer, some portion of the pelletized copolymer intermediate may inadvertently transform to a copolymeric succinic diacid form. In general, this change is more apt to occur as a function of a longer shelf life. The conducting of nitrogen sparging during dissolution of the copolymer intermediate and prior to amination has the benefit of converting the copolymeric succinic diacid back into the desired active polymeric succinic anhydride form before the copolymer intermediate is further reacted and functionalized (e.g., aminated). Consequently, a more highly functionalized and active aminated product may be obtained in subsequent processing. The conversion of polymeric succinic diacid present back into the active polymeric succinic anhydride form can be monitored by measuring the viscosity of the solution. The solution viscosity decreases significantly from an initial higher value down to a steady-state value upon conversion of all or essentially all of the polymeric succinic diacid back into the desired polymeric succinic anhydride form.

The neutral oil may be selected from Group I base stock, Group II base stock, Group III base stock, Group IV or poly-alpha-olefins (PAO), or base oil blends thereof.

The dissolved pelletized copolymer intermediate possessing carboxylic acid acylating functions is reacted with an amine compound. The amine may be selected from compounds such as described, e.g., in U.S. Pat. Nos. 4,863,623, 5,075,383, and 6,107,257, which descriptions are incorporated herein by reference.

In one embodiment, the amine compound may be an aromatic amine selected from the group consisting of:

(a) an N-arylphenylenediamine represented by the formula:

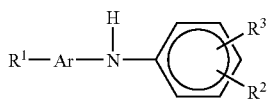

in which Ar is aromatic and $R^1$ is —H, —$NH_2$, —(—NH-Aryl)$_n$—H, —(—NH-Alkyl)$_n$—H, —NH-arylalkyl, a branched or straight chain radical having from 4 to 24 carbon atoms that can be alkyl, alkenyl, alkoxyl, aralkyl, alkaryl, hydroxyalkyl or aminoalkyl; $R^2$ is (—$NH_2$, —(NH(CH$_2$)$_n$—)$_m$—$NH_2$, —(CH$_2$)$_n$—$NH_2$, -aryl-$NH_2$, in which n and m each has a value from 1 to 10, and $R^3$ is hydrogen, alkyl, alkenyl, alkoxyl, aralkyl, alkaryl having from 4 to 24 carbon atoms, (b) an aminocarbazole represented by the formula:

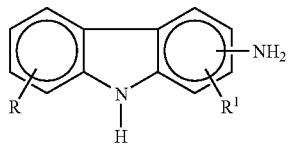

in which R and $R^1$ represent hydrogen or an alkyl, alkenyl, or alkoxyl radical having from 1 to 14 carbon atoms, (c) an aminoindole represented by the formula:

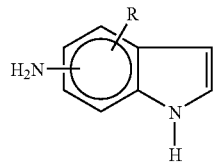

in which R represents hydrogen or an alkyl radical having from 1 to 14 carbon atoms, (d) an amino-indazolinone represented by the formula:

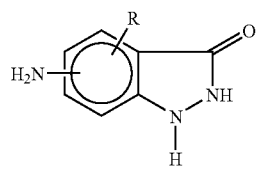

in which R is hydrogen or an alkyl radical having from 1 to 14 carbon atoms, (e) an aminopyrimidine represented by the formula:

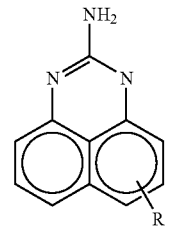

in which R represents hydrogen or an alkyl or alkoxyl radical having from 1 to 14 carbon atoms.

In one embodiment, the amine compound may be, e.g., an N-arylphenylenediamine represented by the general formula:

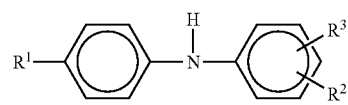

in which $R^1$ is hydrogen, —NH-aryl, —NH-arylalkyl, —NH-alkyl, or a branched or straight chain radical having from 4 to 24 carbon atoms that can be alkyl, alkenyl, alkoxyl, aralkyl, alkaryl, hydroxyalkyl or aminoalkyl; $R^2$ is —$NH_2$, $CH_2$—(CH$_2$)$_n$—$NH_2$, $CH_2$-aryl-$NH_2$, in which n has a value from 1 to 10 and R.sup.3 is hydrogen, alkyl, alkenyl, alkoxyl, aralkyl, alkaryl having from 4 to 24 carbon atoms.

Particularly useful aromatic amines in the present disclosure are the N-arylphenylenediamines, more specifically the N-phenylphenylenediamines, for example, N-phenyl-1,4-phenylenediamine, N-phenyl-1,3-phenylendiamine, and N-phenyl-1,2-phenylenediamine.

It is desirable that the amines contain only one primary amine group so as to avoid coupling and/or gelling of the olefin copolymers. The copolymers reacted with aromatic amines devoid of aliphatic amines are typically copolymers having a number average molecular weight ranging from about 15,000 to about 25,0000 as described above.

In another embodiment, the amine may be a mixture of aromatic amines as described above aliphatic amines. Suitable aliphatic amines may have the formula

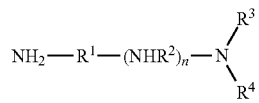

(wherein $R^1$ and $R^2$ are alkylene or alkyl substituted allylene groups having up to 7 carbon atoms; $R^3$ and $R^4$ are hydrogen atoms, alkyl groups having up to 7 carbon atoms, or amino substituted alkyl groups, the amino substituents including alkylene diamine or polyalkylene polyamine groups in which the alkylene group has up to 7 carbon atoms; and n is 0 or 1 to 5). The polyamine reactant preferably has primary, secondary and tertiary basic nitrogen atoms. Examples of aliphatic amine reactants are alkylene-polyamines (for instance ethylenediamine, propylenediamine, butylenediamine or pentylenediamine); polyalkylenepolyamines (for instance diethylenetriamine, triethylenetetramine, tetraethylenepentamine, pentaethylenehexamine, di(methylethylene)-triamine, dibutylenetriamine, tributylenetetramine dipropylenetriamine, bis(hexamethylene)triamine, trimethylhexamethylenediamine, N-hydroxyethyl ethylenediamine, or dipentylenehexamine); dialkylaminoalkylamines (for instance dimethylaminomethylamine, dimethylaminoethylamine, dimethylaminopropylamine, 1,3,6-trisaminomethylcyclohexane, diethylaminopropylamine, 1,4-bis(3-aminopropyl)piperazine, or dimethylaminobutylamine); primary, tertiary amines (for instance tris(2-aminoethyl)amine); and primary, secondary, tertiary amines (for instance tris(2 amino-4-aminobutyl)amine). Convenient aliphatic amine reactants are mixtures of polyethylene polyamines, especially those containing tetraethylene pentamine.

When a mixture of aliphatic and aromatic amines is used as the amine reactant, the mixture of amines may range from about 40 to about 75 weight percent aromatic amines and from about 25 to about 60 weight percent aliphatic amines. Below about 15 weight percent aliphatic amines in the mixture there is little or no advantage of using a mixture of aromatic and aliphatic amines as the amine reactant. The mixture of aromatic and aliphatic amines is particularly useful with grafted copolymers having a number average molecular weight above about 20,000, typically from about 35,000 to about 45,000 number average molecular weight. The amount of the amine may, in certain embodiments, be a stoichiometric amount so as to react with the available carboxylic acid functionality on the polymer. Such a reaction product may be particularly useful in synergistically dispersing soot as well as dispersing sludge and varnish.

The reaction between the copolymer having grafted thereon carboxylic acid acylating function and the prescribed amine compound may be conducted by heating a solution of the copolymer substrate under inert conditions and then adding the amine compound to the heated solution generally with mixing to effect the reaction. It is convenient to employ an oil solution of the copolymer substrate heated to 120° to 175° C., while maintaining the solution under a nitrogen blanket. The amine compound may be added to this solution and the reaction is effected under the noted conditions.

The amine compound may be dissolved with a surfactant and added to a mineral or synthetic lubricating oil or solvent solution containing the acylated olefin copolymer. The solution of amine and olefin copolymer may be heated with agitation under an inert gas purge at a temperature in the range of 120° to 200° C. as described in U.S. Pat. No. 5,384,371, the disclosure of which is herein incorporated by reference. The reactions may be carried out conveniently in a stirred reactor under nitrogen purge.

Surfactants which may be used in carrying out the reaction of the acylated olefin copolymer with the polyamine(s) include but are not limited to those characterized as having (a) solubility characteristics compatible with mineral or synthetic lubricating oil, (b) boiling point and vapor pressure characteristics so as not to alter the flash point of the oil and (c) polarity suitable for solubilizing the polyamine(s).

A suitable class of such surfactants includes the reaction products of aliphatic and aromatic hydroxy compounds with ethylene oxide, propylene oxide or mixtures thereof. Such surfactants are commonly known as aliphatic or phenolic alkoxylates. Useful surfactants can include those surfactants that contain a functional group, e.g., —OH, capable of reacting with the acylated olefin copolymer. Ethoxylated lauryl alcohol ($C_{12}H_{25}(OCH_2CH_2)_nOH$) is also useful herein. Ethoxylated lauryl alcohol is identified under CAS no. 9002-92-0. The ethoxylated lauryl alcohol is a processing aid and viscosity stabilizer for the final multifunctional viscosity modifier product. The ethoxylated lauryl alcohol facilitates the amine charge into the reaction mixture. It is a reaction agent ensuring that no acylated functionality is left unreacted. Any unreacted acylated functionality causes undesirable viscosity drift in finished lubrication formulations. The surfactant also modifies the viscoelastic response in the multifunctional viscosity modifier product allowing improved handling at low temperature (70 to 90° C.).

The quantity of surfactant used depends in part on its ability to solubilize the amine. Typically, concentrations of 5 to 40 wt. % amine are employed. The surfactant may also be added separately, instead of or in addition to the concentrates discussed above, such that the total amount of surfactant in the finished additive is 10 wt. % or less.

The highly grafted, multi-functional olefin copolymers of the present disclosure may be incorporated into lubricating oil in any convenient way. Thus, the highly grafted, multi-functional olefin copolymers may be added directly to the lubricating oil by dispersing or dissolving the same in the lubricating oil at the desired level of concentration. Such blending into the lubricating oil may occur at room temperature or elevated temperatures. Alternatively, the highly grafted, multi-functional olefin copolymers may be blended with a suitable oil-soluble solvent/diluent (such as benzene, xylene, toluene, lubricating base oils and petroleum distillates) to form a concentrate, and then blending the concentrate with a lubricating oil to obtain the final formulation. Such additive concentrates will typically contain (on an active ingredient (A.I.) basis) from about 3 to about 45 wt. %, and preferably from about 10 to about 35 wt. %, highly grafted, multi-functional olefin copolymer additive, and typically from about 20 to 90 wt %, preferably from about 40 to 60 wt %, base oil based on the concentrate weight.

Several of the amine reactants have the tendency to form highly colored oxidation products, comprising members of the class of staining amine antioxidants. Unreacted amine which is left in the oil solution after the amination reaction may give rise to undesirable and/or unstable color in the oil solution. The acylated olefin copolymer also may be color stabilized after the amination reaction, such as by reacting the acylated olefin copolymer with a $C_7$ to $C_{12}$ alkyl aldehyde (e.g., nonyl aldehyde). For example, the reaction may proceed when the alkyl aldehyde agent is added in an amount of about 0.2 to about 0.6 wt. % under similar temperature and pressure conditions as used in the amination reaction for about 2 to about 6 hours.

To increase the purity of the aminated, color stabilized acylated olefin copolymer product, it may be filtered by either bag or cartridge filtration or both in series.

As indicated above, the copolymer intermediate may be prepared in the absence of solvent. Also, the copolymer intermediate may be received in pelletized or bale form as a starting material for performing the additional functionalization(s), viz. amination and color stabilization, on the grafted copolymer intermediate. The copolymer intermediate need not be received directly from the die face of an extruder or similar grafting reaction vessel, but instead the copolymer intermediate has been vacuum stripped of unreacted reactants and pelletized before these further functionalizations are performed on it. Therefore, the pelletized copolymer intermediate may contain less contaminants than a product that has been grafted in the presence of a solvent (which can lead to side reaction products) and/or aminated immediately after the grafting reaction as part of a continuous process flow arrangement (which leaves unreacted components as impurities in the reaction mass).

In addition, the use of inert gas sparging on the copolymer intermediate dissolved in neutral oil prior to amination has the benefit of converting polymeric succinic diacid present back into the desired active polymeric succinic anhydride form before the copolymer intermediate is further reacted and functionalized (e.g, aminated).

Also, since unreacted graft monomer, e.g., maleic anhydride is effectively removed after the grafting step during vacuum stripping that precedes pelletizing and dissolution, amination proceeds more efficiently. That is, the presence of unreacted graft monomers are undesirable during the amination step as they may compete with the grafted copolymer (polymer intermediate) in reactions with the amine, reducing the level of functionalization achieved.

Therefore, the multi-functional reaction end product of embodiments of the present disclosure may contain fewer impurities (i.e., unreacted reactants, side reaction products and by-products) and may be more active for a given amount thereof. In one embodiment, the additive reaction product contains less than 0.1 wt. % total impurities comprising unreacted reactants, side reaction products and reaction by-products. The remainder is composed of active grafted, multifunctionalized olefin copolymer either entirely, or substantially in combination with some minor amount of beneficial or inert additive introduced during processing, such as an antioxidant or colorant, which does not significantly reduce or impair the activity of the product compound.

The highly grafted, multi-functional olefin copolymer product compounds of the present disclosure optionally may be post-treated so as to impart additional properties necessary or desired for a specific lubricant application. Post-treatment techniques are well known in the art and include boronation, phosphorylation, glycolation, ethylene-carbonation, and maleination.

Lubricating oil formulations for internal combustion engines as described herein may conventionally contain additional additives that will supply the characteristics that are required in the formulations. Among these types of additives are included additional viscosity index improvers, antioxidants, corrosion inhibitors, detergents, dispersants, pour point depressants, antiwear agents, antifoaming agents, demulsifiers and friction modifiers. These additives are provided in what is commonly called a dispersant/inhibitor (DI) package.

One component of the DI package is a metal-containing or ash-forming detergent that functions as both a detergent to reduce or remove deposits and as an acid neutralizer or rust inhibitors, thereby reducing wear and corrosion and extending engine life. Detergents that may be used include oil-soluble neutral and overbased sulfonates, phenates, sulfurized phenates, thiophosphonates, salicylates, and naphthenates and other oil-soluble carboxylates of a metal, particularly the alkali or alkaline earth metals, e.g., barium, sodium, potassium, lithium, calcium, and magnesium. The most commonly used metals are calcium and magnesium, which may both be present in detergents used in a lubricant, and mixtures of calcium and/or magnesium with sodium. Particularly convenient metal detergents are neutral and overbased calcium sulfonates having TBN of from 20 to 450, neutral and overbased calcium phenates and sulfurized phenates having TBN of from 50 to 450 and neutral and overbased magnesium or calcium salicylates having a TBN of from 20 to 450. Combinations of detergents, whether overbased or neutral or both, may be used. In one preferred lubricating oil composition.

Detergents generally useful in the formulation of lubricating oil compositions also include "hybrid" detergents formed with mixed surfactant systems, e.g., phenate/salicylates, sulfonate/phenates, sulfonate/salicylates, sulfonates/phenates/ salicylates, as described, for example, in U.S. Pat. Nos. 6,153, 565, 6,281,179, 6,429,178 and 6,429,179.

Dispersants maintain in suspension materials resulting from oxidation during use that are insoluble in oil, thus preventing sludge flocculation and precipitation, or deposition on metal parts. Dispersants useful in the context of the disclosure include the range of nitrogen-containing, ashless (metal-free) dispersants known to be effective to reduce formation of deposits upon use in gasoline and diesel engines, when added to lubricating oils.

Processes for reacting polymeric hydrocarbons with unsaturated carboxylic acids, anhydrides or esters and the preparation of derivatives from such compounds are disclosed in U.S. Pat. Nos. 3,087,936; 3,172,892; 3,215,707; 3,231,587; 3,272,746; 3,275,554; 3,381,022; 3,442,808; 3,565,804; 3,912,764; 4,110,349; 4,234,435; 5,777,025; 5,891,953; as well as EP 0 382 450 B1; and CA-1,335,895.

A preferred dispersant composition is one comprising at least one polyalkenyl succinimide, which is the reaction product of a polyalkenyl substituted succinic anhydride (e.g., PIBSA) and a polyamine (PAM) that has a coupling ratio of from about 0.65 to about 1.25, preferably from about 0.8 to about 1.1, most preferably from about 0.9 to about 1. In the context of this disclosure, "coupling ratio" may be defined as a ratio of the number of succinyl groups in the PIBSA to the number of primary amine groups in the polyamine reactant.

Another class of high molecular weight ashless dispersants comprises Mannich base condensation products. Generally, these products are prepared by condensing about one mole of a long chain alkyl-substituted mono- or polyhydroxy benzene with about 1 to 2.5 moles of carbonyl compound(s) (e.g., formaldehyde and paraformaldehyde) and about 0.5 to 2 moles of polyalkylene polyamine, as disclosed, for example, in U.S. Pat. No. 3,442,808. Such Mannich base condensation products may include a polymer product of a metallocene catalyzed polymerization as a substituent on the benzene group, or may be reacted with a compound containing such a polymer substituted on a succinic anhydride in a manner similar to that described in U.S. Pat. No. 3,442,808. Other suitable dispersants are described in U.S. Pat. Nos. 4,839, 071; 4,839,072; 4,579,675; 3,185,704; 3,373,111; 3,366,569; 4,636,322; 4,663,064; 4,612,132; 5,334,321; 5,356,552; 5,716,912; 5,849,676; 5,861,363; 4,686,054; 3,254,025; 3,087,936. The foregoing list is not exhaustive and other methods of capping nitrogen-containing dispersants are known to those skilled in the art.

Additional additives may be incorporated into the compositions of the disclosure to enable particular performance requirements to be met. Examples of additives which may be included in the lubricating oil compositions of the present disclosure are metal rust inhibitors, viscosity index improvers, corrosion inhibitors, oxidation inhibitors, friction modifiers, anti-foaming agents, anti-wear agents and pour point depressants. Some are discussed in further detail below.

Dihydrocarbyl dithiophosphate metal salts are frequently used as antiwear and antioxidant agents. The metal may be an alkali or alkaline earth metal, or aluminum, lead, tin, molybdenum, manganese, nickel or copper. The zinc salts are most commonly used in lubricating oil in amounts of 0.1 to 10, preferably 0.2 to 2 wt. %, based upon the total weight of the lubricating oil composition.

Particularly desirable zinc salt include zinc dihydrocarbyl dithiophosphates that may be represented by the following formula:

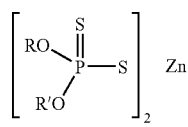

wherein R and R' may be the same or different hydrocarbyl radicals containing from 1 to 18, preferably 2 to 12, carbon atoms and including radicals such as alkyl, alkenyl, aryl, arylalkyl, alkaryl and cycloaliphatic radicals.

Oxidation inhibitors or antioxidants reduce the tendency of mineral oils to deteriorate in service. Oxidative deterioration can be evidenced by sludge in the lubricant, varnish-like deposits on the metal surfaces, and by viscosity growth. Such oxidation inhibitors include hindered phenols, alkaline earth metal salts of alkylphenolthioesters having preferably $C_5$ to $C_{12}$ alkyl side chains, calcium nonylphenol sulfide, oil soluble phenates and sulfurized phenates, phosphosulfurized or sulfurized hydrocarbons or esters, phosphorous esters, metal thiocarbamates, oil soluble copper compounds as described in U.S. Pat. No. 4,867,890, and molybdenum-containing compounds.

Aromatic amines having at least two aromatic groups attached directly to the nitrogen constitute another class of compounds that is frequently used for antioxidancy. While these materials may be used in small amounts, preferred embodiments of the present disclosure are free of these compounds. When used, the amount of aromatic amines may range from about 0.1 to about 1.5 percent by weight of the total weight of the lubricating oil composition. A particularly useful amount of aromatic amines may be up to about 0.4 wt. % based on the total weight of the lubricating oil composition.

Representative examples of suitable viscosity modifiers are polyisobutylene, copolymers of ethylene and propylene, polymethacrylates, methacrylate copolymers, copolymers of an unsaturated dicarboxylic acid and a vinyl compound, interpolymers of styrene and acrylic esters, and partially hydrogenated copolymers of styrene/isoprene, styrene/butadiene, and isoprene/butadiene, as well as the partially hydrogenated homopolymers of butadiene and isoprene.

Friction modifiers and fuel economy agents that are compatible with the other ingredients of the final oil may also be included. Examples of such materials include glyceryl monoesters of higher fatty acids, for example, glyceryl mono-oleate; esters of long chain polycarboxylic acids with diols, for example, the butane diol ester of a dimerized unsaturated fatty acid; oxazoline compounds; and alkoxylated alkyl-substituted mono-amines, diamines and alkyl ether amines, for example, ethoxylated tallow amine and ethoxylated tallow ether amine.

Other known friction modifiers comprise oil-soluble metallic compounds such as organo-molybdenum compounds, organo-titanium compounds and organo-tungsten compounds. Such organo-metallic friction modifiers may also provide antioxidant and antiwear credits to a lubricating oil composition. As an example of such oil soluble organo-metallic compounds, there may be mentioned the carboxylatess, dithiocarbamates, dithiophosphates, dithiophosphinates, xanthates, thioxanthates, sulfides, and the like, and mixtures thereof. Particularly useful organo-metallic compounds include molybdenum dithiocarbamates, dialkyldithiophosphates, alkyl xanthates, and alkylthioxanthates. Other organo-metallic compounds may include the oil soluble titanium and tungsten carboxylates.

The terms "oil-soluble" or "dispersible" used herein do not necessarily indicate that the compounds or additives are soluble, dissolvable, miscible, or capable of being suspended in the oil in all proportions. These do mean, however, that they are, for instance, soluble or stably dispersible in oil to an extent sufficient to exert their intended effect in the environment in which the oil is employed. Moreover, the additional incorporation of other additives may also permit incorporation of higher levels of a particular additive, if desired.

Pour point depressants, otherwise known as lube oil flow improvers (LOFI), lower the minimum temperature at which the fluid will flow or can be poured. Such additives are well known. Typical of those additives that improve the low temperature fluidity of the fluid are $C_8$ to $C_{18}$ dialkyl fumarate/vinyl acetate copolymers, and polymethacrylates. Foam control may be provided by an antifoamant of the polysiloxane type, for example, silicone oil or polydimethyl siloxane.

Some of the above-mentioned additives can provide a multiplicity of effects; thus for example, a single additive may act as a dispersant-oxidation inhibitor. This approach is well known and need not be further elaborated herein.

When lubricating compositions contain one or more of the above-mentioned additives comprising the DI package, each additive is typically blended into the base oil in an amount that enables the additive to provide its desired function. Representative effective amounts of such additives, when used in crankcase lubricants, are listed below. All the values listed are stated as mass percent active ingredient.

| Additive | Mass % (Broad) | Mass % (Typical) |
|---|---|---|
| Metal Detergents | 0.1 to 15.0 | 0.29 to 9.0 |
| Dispersants | 0.1 to 10.0 | 1.0 to 6.0 |
| Corrosion Inhibitor | 0 to 5.0 | 0 to 1.5 |
| Metal Dihydrocarbyl Dithiophosphate | 0 to 6.0 | 0.1 to 4.0 |
| Antioxidant | 0 to 5.0 | 0.01 to 2.0 |
| Pour Point Depressant | 0.01 to 5.0 | 0.01 to 1.5 |
| Antifoaming Agent | 0 to 5.0 | 0.001 to 0.15 |
| Supplemental Antiwear Agents | 0 to 1.0 | 0 to 0.5 |
| Friction Modifiers | 0 to 5.0 | 0 to 1.5 |
| Viscosity Modifier | 0.01 to 10.0 | 0.25 to 3.0 |
| Basestock | Balance | Balance |

In the preparation of lubricating oil formulations it is common practice to introduce the additives in the form of 10 to 80 wt. % active ingredient concentrates in hydrocarbon oil, e.g. mineral lubricating oil, or other suitable solvent.

Usually these concentrates may be diluted with 3 to 100, e.g., 5 to 40, parts by weight of lubricating oil per part by weight of the additive package in forming finished lubricants, e.g. crankcase motor oils. The purpose of concentrates, of course, is to make the handling of the various materials less difficult and awkward as well as to facilitate solution or dispersion in the final blend. Thus, the highly grafted, multi-functional olefin copolymer would usually be employed in the form of a 10 to 50 wt. % concentrate, for example, in a lubricating oil fraction. In one embodiment, the amount of concentrate in a finished lubricating oil is from about 0.05 weight percent to about 8 weight percent of the total lubricating oil.

The highly grafted, multi-functional olefin copolymers of the present disclosure will generally be used in admixture with a lube oil base stock, comprising an oil of lubricating viscosity, including natural lubricating oils, synthetic lubricating oils and mixtures thereof.

Natural oils include animal oils and vegetable oils (e.g., castor, lard oil), liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. The synthetic lubricating oils used in this disclosure include one of any number of commonly used synthetic hydrocarbon oils, which include, but are not limited to, poly-alpha-olefins, alkylated aromatics, alkylene oxide polymers, copolymers, terpolymer, interpolymers and derivatives thereof here the terminal hydroxyl groups have been modified by esterification, etherification, etc, esters of dicarboxylic acids, and silicon-based oils.

The highly grafted, multi-functional olefin copolymer products of the present disclosure made with an aromatic amine devoid of aliphatic amines find their primary utility in lubricating oil compositions which employ a base oil having a viscosity index above about 120 up to about 200 in which the additives are dissolved or dispersed in amount sufficient to provide the desired functionality. Such base oils may be natural, synthetic or mixtures thereof. Accordingly, such base oils for use in preparing the lubricating oil compositions described herein may include a major portion of base oil selected from Group III base oils, Group IV base oils, gas-to-liquid base oils, and mixtures thereof wherein more than 50 wt. % of the base oil comprises a base oil having a viscosity index above about 125 up to about 200 for use as crankcase lubricating oils for spark-ignited and compression-ignited internal combustion engines, such as automobile and truck engines, marine and railroad diesel engines, and the like.

Among other advantages, the highly grafted olefin copolymers reacted with aromatic amines devoid of aliphatic amines have been observed in performance tests to provide improved soot dispersing and/or viscosity stabilizing performance in high viscosity index base oils. The highly grafted olefin copolymers reacted with a mixture of aromatic and aliphatic amines as described above have been observed to provide greater dispersancy for a wide variety of materials found in engine oils that may cause oil filter plugging than simply a mixture of aromatic and aliphatic dispersant VI improvers.

The present disclosure is further directed to a method of extending lubricant drain intervals in a vehicle is contemplated. The method includes adding to and operating in the crankcase of the vehicle the lubricating oil composition described above.

The disclosures of all patents, articles and other materials described herein are hereby incorporated, in their entirety, into this specification by reference. Compositions described as "comprising" a plurality of defined components are to be construed as including compositions formed by admixing the defined plurality of defined components. The principles, preferred embodiments and modes of operation of the present disclosure have been described in the foregoing specification. What applicants submit, however, is not to be construed as limited to the particular embodiments disclosed, since the disclosed embodiments are regarded as illustrative rather than limiting. Changes may be made by those skilled in the art without departing from the spirit of the disclosed embodiments.

What is claimed is:

1. A lubricating oil composition for lubricating an internal combustion engine comprising:
   a major amount of oil of lubricating viscosity; and
   a minor amount of at least one highly grafted, multi-functional olefin copolymer made by reacting an acylating agent with an olefin copolymer comprising a copolymer of ethylene and one or more $C_3$-$C_{23}$ alpha olefins having a number average molecular weight greater than about 10,000 up to about 50,000 in the presence of a free radical initiator to provide an acylated olefin copolymer having a degree of grafting (DOG) of the acylating agent on the olefin copolymer of from above about 1.5 to about 3.0 wt. %, and reacting the acylated olefin copolymer with a mixture of aliphatic and aromatic amines to provide the highly grafted, multi-functional olefin copolymer, wherein the aromatic amine in the mixture of amines comprises from about 40 to about 75 percent by weight of the total weight of the mixture of amines and the aliphatic amine in the mixture comprises from about 25 to about 60 percent by weight of the total weight of the mixture of amines.

2. The lubricating oil composition of claim 1, wherein the oil of lubricating viscosity has a saturates content of at least 75 wt. %.

3. The lubricating oil composition of claim 1, wherein the oil of lubricating viscosity comprises a high viscosity index base stock having a viscosity index above about 120, the copolymer has a number average molecular weight ranging from about 15,000 to about 25,000.

4. The lubricating oil composition of claim 1, further comprising a dispersant/inhibitor package comprising a dispersant, a metal-containing detergent, an antiwear agent, an antioxidant, and a friction modifier.

5. The lubricating oil composition of claim 4, wherein the detergent is selected from the group consisting of neutral and overbased calcium sulfonate, neutral and overbased magnesium sulfonate, neutral and overbased calcium phenate, calcium salicylate, magnesium salicylate, and mixtures thereof.

6. The lubricating oil composition of claim 4, wherein the dispersant comprises one or more polyalkenyl succinimide dispersants.

7. The lubricating oil composition of claim 4, wherein the friction modifier is selected from the group consisting of non-metal containing organic friction modifiers, organometallic friction modifiers, and mixtures thereof.

8. The lubricating oil composition of claim 7, wherein the organometallic friction modifier is selected from the group consisting of oil soluble organo-titanium, oil soluble organo-molybdenum compounds, and oil soluble organo-tungsten compounds.

9. The lubricating oil composition of claim 7, wherein the non-metal containing friction modifier is selected from the group consisting of glycerol monooleate, and nitrogen containing friction modifiers.

10. The lubricating oil composition of claim 1, wherein the acylated olefin copolymer has a degree of grafting (DOG) ranging from about 2.0 to about 2.5 wt. %.

11. The lubricating oil composition of claim 1, wherein the olefin copolymer has a number average molecular weight ranging from about 20,000 to about 40,000.

* * * * *